3,733,419
CONTROLLING FUNGI AND BACTERIA WITH
CERTAIN OXIME ESTERS
Arnold D. Gutman, Berkeley, Calif., assignor to Stauffer
Chemical Company, New York, N.Y.
No Drawing. Continuation-in-part of application Ser. No.
52,769, July 6, 1970, which is a continuation-in-part
of application Ser. No. 879,967, Dec. 4, 1969, which
in turn is a division of application Ser. No. 649,024,
June 26, 1967, all now abandoned. This application
Feb. 18, 1972, Ser. No. 227,610
Int. Cl. A01n 9/20
U.S. Cl. 424—327                    20 Claims

ABSTRACT OF THE DISCLOSURE

A process for controlling fungi and bacteria with compounds having the formula

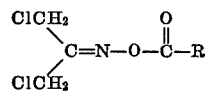

in which R is alkyl having from 1 to 6 carbon atoms; haloalkyl having from 1 to 6 carbon atoms; or alkenyl having from 2 to 4 carbon atoms.

---

This application is a continuation-in-part of application Ser. No. 52,769, filed July 6, 1970, which is a continuation-in-part of application Ser. No. 879,967, filed filed Dec. 4, 1969, which is a divisional of application Ser. No. 649,024, filed June 26, 1967, all now abandoned.

This invention relates to the use of certain keto oxime esters in controlling fungi and bacteria.

The compounds useful in the process of the present invention are those having the formula

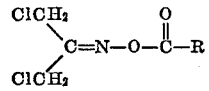

in which R is alkyl having from 1 to 6 carbon atoms; haloalkyl having from 1 to 6 carbon atoms, preferably halomethyl; or alkenyl having from 2 to 4 carbon atoms.

The compounds useful in the process of the present invention can be prepared by reacting a compound of the formula

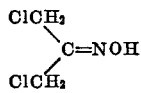

with a compound of the formula

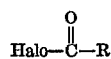

in which halo is chlorine or bromine and R is as defined.

Preferably, the reaction is carried out in the presence of a base such as pyridine and in a solvent for the reactants. Generally, the reaction is exothermic so no heating is required. Cooling is sometimes required to control the reaction rate. The compounds of this invention can be recovered from the mixture and purified by standard procedures.

Compounds of the formula

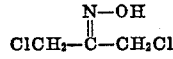

can be prepared by reacting

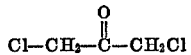

with excess hydroxylamine hydrochloride or hydroxylamine hydrobromide in ethanol and water. The reaction can be run with heating under reflux for several hours.

The desired product is recovered and purified by conventional techniques.

Preparation of the compounds useful in the practice of the process of this invention is illustrated by the following examples.

EXAMPLE 1

1,3-dichloroacetoneoxime 63.5 grams (0.50 mole) of 1,3-dichloropropanone, 69.5 grams (1.00 mole) hydroxylamine hydrochloride, 250 milliliters ethanol and 25 milliliters of water were combined and heated under reflux for four hours. The cooled mixture was poured into 500 milliliters of water. The aqueous solution was extracted with 3–100 milliliter portions of chloroform. The chloromorm phases were combined and dried with anhydrous MgSO₄. The chloroform was evaporated to give 66.3 grams (93.6 percent of theory) of 1,3-dichloroacetoneoxime.

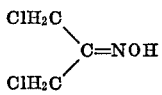

$N_D^{30} = 1.5044$.

EXAMPLE 2

1,3-dichloroacetoneoxime trichloroacetate 7.1 grams (0.05 mole) 1,3-dichloroacetoneoxime, 9.1 grams (0.05 mole) trichloroacetyl chloride and 100 milliliters benzene were added to a 500 milliliter flask, stirred and cooled to 10° C. with an ice bath. 4.7 grams (0.06 mole) pyridine was added at a rate sufficient to maintain the reaction temperature below 20° C. After the addition of the pyridine, the ice bath was removed, and the mixture was stirred at a room temperature for one hour. An additional 100 milliliters benzene was added, and the mixture was washed with 50 milliliters dilute HCl followed by two 100 milliliter water washes. The benzene phase was dried with MgSO₄ and evaporated to give 10.4 grams 1,3-dichoroacetoneoxime trichloroacetate.

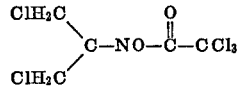

$N_D^{30} = 1.5078$.

EXAMPLE 3

1,3-dichloroacetoneoximecrotonate 10.0 grams (0.07 mole) 1,3-dichloroacetoneoxime, 7.2 grams (0.07 mole) crotonyl chloride were combined in 100 milliliters of of benzene. The mixture was stirred and cooled to 10° C. 6.3 grams (0.08 mole) of pyridine was added over a period of 15 minutes. The mixture was stirred at room temperature for one hour. An additional 100 milliliters benzene was added and the mixture was washed with two 100 milliliter portions of water. The benzene phase was dried with anhydrous MgSO₄ and evaporated to give 8.3 grams (55.8 percent of theory) of 1,3-dichloroacetoneoximinocrotonate

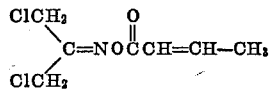

$N_D^{30} = 1.5090$.

TABLE I

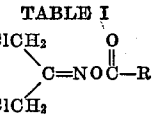

| Compound No. | R |
|---|---|
| 1 [a] | Trichloromethyl. |
| 2 [b] | 1-propenyl. |
| 3 | Vinyl. |
| 4 | Bromomethyl. |
| 5 | Methyl. |
| 6 | Ethyl. |
| 7 | Hexyl. |

[a] Prepared in Example 2.
[b] Prepared in Example 3.

In Vitro Vial Test

The following test illustrates utility of the compounds in controlling fungi and bacteria. This test measures the bactericidal and fungicidal properties of a compound when in contact with a growing bacterium or fungus. The test is conducted by partially filling two 1-ounce vials with malt broth and one 1-ounce vial with nutrient broth. Next the test compound is added to the vials at a certain concentration, expressed in parts per million, and mixed with the broth. A water suspension of spores of the desired fungi or cells of the desired bacteria (one organism per vial) is added. The vials are then sealed and incubated for one week; at this time the vials are examined and the results recorded. Table II shows the results of various compounds tested by the In Vitro Vial Test, partial control of the test organism is indicated by parenthesis.

TABLE II

Concentration (p.p.m.) Which Inhibited Growth

| Compound number | Aspergillus niger | Penicillium sp. | Escherichia coli | Staphylococcus aureus |
|---|---|---|---|---|
| 1 | >50 | (50) | >50 | 25 |
| 2 | (0.25) | 0.5 | (50) | 10 |
| 3 | 0.25 | (0.25) | 25 | 10 |
| 4 | 50 | (25) | >50 | 50 |
| 5 | 0.5 | (0.25) | 5 | 10 |
| 6 | 0.13 | (0.06) | 5 | 25 |
| 7 | 1 | 5 | >50 | 25 |

As can be seen by the test results, the compounds find particular utility as bactericides and fungicides. The compounds can be applied in a variety of ways at various concentrations. They can be combined with suitable carriers and applied as dusts, sprays, or drenches. The amount applied will depend on the nature of the utility. The rate of application can also vary with the microbiological use intended.

It is claimed:

1. The method of inhibiting the growth of bacteria which comprises applying thereto a bactericidally effective amount of the compound having the formula

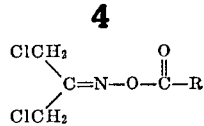

in which R is alkyl having from 1 to 6 carbon atoms; haloalkyl having from 1 to 6 carbon atoms; or alkenyl having from 2 to 4 carbon atoms.

2. The process of claim 1 in which R is alkenyl having 2 to 4 carbon atoms.
3. The process of claim 2 in which R is 1-propenyl.
4. The process of claim 2 in which R is vinyl.
5. The process of claim 2 in which R is allyl.
6. The process of claim 1 in which R is alkyl having 1 to 6 carbon atoms.
7. The process of claim 6 in which R is methyl.
8. The process of claim 6 in which R is ethyl.
9. The process of claim 6 in which R is n-propyl.
10. The process of claim 6 in which R is hexyl.
11. The method of inhibiting the growth of fungi which comprises applying thereto a fungicidally effective amount of the compound having the formula

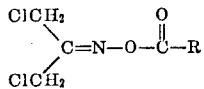

in which R is alkyl having from 1 to 6 carbon atoms; haloalkyl having from 1 to 6 carbon atoms; or alkenyl having from 2 to 4 carbon atoms.

12. The process of claim 11 in which R is alkenyl having 2 to 4 carbon atoms.
13. The process of claim 12 in which R is 1-propenyl.
14. The process of claim 12 in which R is vinyl.
15. The process of claim 12 in which R is allyl.
16. The process of claim 11 in which R is alkyl having 1 to 6 carbon atoms.
17. The process of claim 16 in which R is methyl.
18. The process of claim 16 in which R is ethyl.
19. The process of claim 16 in which R is n-propyl.
20. The process of claim 16 in which R is hexyl.

References Cited

UNITED STATES PATENTS 3,169,989   2/1965   Tieman et al. _____ 260—566 AE

FOREIGN PATENTS 238,537   7/1969   U.S.S.R. _____ 260—566 AE
825,709   10/1969   Canada.

ALBERT T. MEYERS, Primary Examiner
N. A. DREZIN, Assistant Examiner